United States Patent [19]

Russell

[11] Patent Number: 5,745,389

[45] Date of Patent: Apr. 28, 1998

[54] SYSTEM AND MECHANISM FOR ASSIGNING PRE-ESTABLISHED ELECTRONIC ADDRESSES TO PRINTED CIRCUIT BOARDS

[75] Inventor: Robert J. Russell, South Boston, Mass.

[73] Assignee: Bull HN Information Systems Inc., Billerica, Mass.

[21] Appl. No.: 628,589

[22] Filed: Apr. 4, 1996

[51] Int. Cl.$^6$ .............................. G06F 11/00; H04K 1/00
[52] U.S. Cl. ........................ 364/580; 380/55; 395/916
[58] Field of Search .................... 364/580, DIG. 1, 364/DIG. 2, 259, 243, 255.1, 246, 281.3, 282.1; 395/60, 61, 425, 916; 380/4, 28, 55, 50

[56] References Cited

U.S. PATENT DOCUMENTS

| | | | |
|---|---|---|---|
| 4,545,016 | 10/1985 | Berger | 364/200 |
| 4,682,283 | 7/1987 | Robb | 364/200 |
| 4,718,784 | 1/1988 | Drisko | 400/68 |
| 4,920,882 | 5/1990 | Hoyt | 400/708 |
| 5,051,938 | 9/1991 | Hyduke | 364/580 |
| 5,276,738 | 1/1994 | Hirsch | 380/46 |
| 5,317,693 | 5/1994 | Cuenod et al. | 395/275 |
| 5,343,559 | 8/1994 | Lee | 395/425 |
| 5,371,711 | 12/1994 | Nakayama | 261/230.03 |
| 5,371,868 | 12/1994 | Koning et al. | 395/400 |
| 5,553,143 | 9/1996 | Ross et al. | 380/25 |
| 5,568,408 | 10/1996 | Maeda | 364/580 |

*Primary Examiner*—Emanuel T. Voeltz
*Assistant Examiner*—Bryan Bui
*Attorney, Agent, or Firm*—Faith F. Driscoll; John S. Solakian

[57] ABSTRACT

A software implemented control mechanism is used in a test system for assigning unique pre-established electronic addresses which are to be written into the memory elements of printed circuit boards during the manufacture thereof. Each PCB is previously encoded with a scannable board serial number label, and the test system includes a processing unit and a memory configured for storing test software for testing PCBs. The control mechanism is incorporated into the test software which when installed into the test system configures the system's memory for assigning electronic addresses. The control mechanism includes first and second sets of tables containing entries which define the ranges of valid serial numbers and preallocated electronic addresses. A control element within the control mechanism invokes a number of offset computation subroutines which generates an offset value derived from the serial number read from the PCB being processed defining the relative position of the serial number as determined by entry values contained in the first set of tables. The control element provides the received offset value to a number of effective address subroutines which it invokes to select a valid unique electronic address value contained in the ranges of pre-established electronic addresses defined by the entry values contained in the second set of tables.

10 Claims, 3 Drawing Sheets

SYSTEM AND MECHANISM FOR ASSIGNING PRE-ESTABLISHED ELECTRONIC ADDRESSES TO PRINTED CIRCUIT BOARDS

BACKGROUND OF THE INVENTION

1. Field of Use

The present invention relates to the field of manufacture and testing of electronic printed circuit boards and, in particular, to printed circuit boards (PCBs) which utilize electronic addressing to communicate electronically with other printed circuit boards comprising a system or a portion of a system.

2. Prior Art

Printed circuit boards which utilize electronic addressing are typically assigned two identifiers. The first identifier is termed a "serial number", although it is often not restricted to base-10 numerical digits as implied by such term. Letters or other characters may be used to make the first identifier more meaningful to the person observing it or to economize on field size by using number bases greater than base ten. For example, a base-36 number could be represented by combinations of the ten numeric digits 0-9 and the 26 letters of the alphabet in part or all of the first identifier field.

Manufacturers commonly assign unique serial numbers to certain types of PCBs used in a particular user environment. This is done so that other PCBs of the same manufacturer do not use the same identifier. This is customary, but not an absolute requirement. There is typically little or no coordination among manufacturers in assigning serial numbers. Therefore, although various field sizes and numbering schemes are used, it is possible for two PCBs with the same serial number provided by different manufacturers to find their way fortuitously into the particular user environment.

Systems of assigning and tracking PCB serial numbers are commonplace in the industry and have become accepted as a necessary part of a modern manufacturing operation. An effective method of assigning unique serial numbers to PCBs has consisted simply of ordering a set of sequentially numbered labels from a supplier and applying one to each PCB at a select point in the board manufacturing process. These labels often employ bar codes to facilitate accurate serial number entry.

The second identifier is an electronic address. Its purpose is to allow communication between select PCBs or entities operating within a system user environment. The user environment may be as local as a single unit or as widespread as an internationally distributed group of units originating from more than one manufacturer. In the case of electronic addresses, duplication is generally considered intolerable. It cannot be left to chance that distinct units operating within such an environment share the same address and respond to communications which are not intended for receipt by them. Therefore, the assignment of electronic addresses typically requires more coordination than the assignment of serial numbers.

When such coordination is deemed necessary, a group of manufacturing entities needing such addresses will normally come together and agree on a format and range of numbers. They may further agree on having a single provider or organization assign blocks of numbers from within the agreed range on an "as needed" basis. For example, manufacturer A might request the provider to supply a group of 4,096 addresses which are to be used in a 6-digit hexadecimal field and are assigned numbers 32D000 through 32DFFF, while manufacturer B might subsequently request 12,288 addresses and receive assigned numbers 32E000 through 330FFF. It is the responsibility of the provider to ensure uniqueness of assignments.

Such electronic addresses may exist in any form which is capable of being sensed by PCB circuitry. Examples of such forms are an array of jumpers or a PROM or other memory device which retains data in the absence of power. In the case of jumpers, selected ones from the array would be physically cut according to the desired assigned address during the PCB manufacturing process. In the case of a PROM, selected internal fuses may be electronically burned for storing the assigned address. In some PROM applications, an EEPROM may be utilized both to avoid use of the voltages typically required to program non-EEPROM's and to allow reprogramming of other data fields in the same memory device at other times in the product life cycle time period. This other data may include the PCB serial number, date of manufacture, type, revision and hours of use.

Regardless of other data requirements or form of electronic or electrical storage, the task of accurately mating each PCB with a unique electronic address presents a significant burden to a board manufacturer's process irrespective of the method used to program that address into the PCB. Applying one of a second set of sequentially numbered labels (serial numbers being the first set, as noted previously) to the PCB may seem to be a ready solution to this problem. However, it is cumbersome and difficult to ensure that each address label which is properly applied to a PCB is of the correct type or even used at all in an operation where a multiplicity of different PCB types are manufactured. That is, a particular series of labels may inadvertently be applied to PCBs which do not require them. Such an act could go completely undetected or else may be lost through lack of proper control measures.

Given the expense of obtaining unique address assignment blocks from providers, simply ordering new labels when a manufacturer is unsure of the status of missing labels is not considered a satisfactory approach. Ordering duplicate labels would be clearly unsatisfactory because of the risk of eventually shipping two PCBs with the same address. In any case, finding or expecting designers to provide unoccupied space on a PCB for a second label may give rise to insurmountable problems.

Mating addresses to PCBs using written or electronic lists is also unreliable. For example, if an automatic test is used to program addresses into PCBs upon successfully passing a final test, data corruption errors could cause the system to lose track of which addresses had previously been assigned. The rarity of such errors is little justification for relying on such a method given the potential cost of having to recall a series of PCBs if required to be able to determine whether duplicate assignments had been made. It is important to note that such problems are possible even when no hardware error exists during test of the type of PCBs to which addresses are being assigned. That is, for example, part of solving an error experienced with another test may be to reload the test disk storage with backup files made before some addresses were assigned, resulting in duplicated address assignments which may go undetected until the PCBs have been distributed. If build volume dictates use of more than one test system, the problem increases. Errors are possible even if address assignments are provided by a centrally controlled system over a communications link, despite the expense and inability to conduct testing during link outages. Concerns of address assignment errors go beyond theoretical discussion. Actual problems with PCBs that have successfully completed manufacturing using otherwise reliable/competent automated manufacturing processes have been reputed to occur. Further, having an operator use a written list presents even greater likelihood of error.

A further problem with electronic addressing is the difficulty in maintaining an ability to determine the initially assigned electronic address of a PCB throughout its life cycle. For example, it is possible for an address bit to become corrupted and detected as erroneous by error checking circuits during normal operation of the PCB. When the PCB is repaired, the proper electronic address must be correctly written into the PCB. At this point, either the original address must be determined or a new address must be assigned. This requires expensive overhead in terms of keeping records of addresses originally assigned to PCBs according to serial number or a system of assigning "spare" addresses to repair facilities.

Accordingly, it is a primary object of the present invention to provide a method of assigning electronic addresses to PCBs during a manufacturing operation which minimizes the possibility of duplicating or omitting assigned addresses.

It is a further object of the present invention to provide a method which can be conveniently utilized during automatic board test operations.

It is a still further object of the present invention to provide a method wherein the electronic address programmed into a PCB may be verified as to correctness throughout its entire life cycle.

SUMMARY OF THE INVENTION

The above objects and advantages of the present invention are achieved in a preferred embodiment of the present invention which encompasses a software control mechanism and a method of assigning unique electronic addresses to internal memory contained within PCBs of a given type during their manufacture. Such electronic addresses are preassigned and required to be incorporated into the PCBs for proper operation when the PCBs are utilized as part of a system. For example, in the preferred embodiment, such PCBs perform a local area network (LAN) function when used in a communications networking environment which require assignment of unique electronic addresses for proper routing of information.

According to the teachings of the present invention, a range of serial numbers having a preestablished relationship to one another are selected for allocation or assignment to a group of PCBs of a given type to be manufactured. A label is affixed to each manufactured PCB of the given type which is encoded (e.g. bar coded) with a unique one of the serial numbers from the selected range.

The range is normally selected to be large enough to allow a unique serial number within the range to be assigned to the total number of PCBs planned to be manufactured. The relationship between successive serial numbers in the selected range is such that the relative place of a given serial number within the series of serial numbers is determinable by a predetermined process which may be a simple operation such as incrementing by one or a combination of operations.

Hence, the above relationship can be made simple or complex. For example, assume that the serial numbers were assigned as decimal numbers starting with the value 0001 and successively incremented by one (i.e. have an incremental value of one) to obtain successive serial numbers within the range of assignable serial numbers. A PCB labeled with serial number 1357 could be readily determined to be the 1,357th in that particular series of successive serial numbers by performing the operations of subtracting the value of the starting number value minus one from the PCB label serial number (i.e. 1357−[0001−1]=1357).

An example of a complex relationship is where a PCB is labeled or encoded with a serial label ABC11403 which is the 6,316th in a range or series of serial numbers where the first three characters of the label are fixed to designate the PCB type and the last five characters are hexadecimal digits derived from a 19-bit binary number which includes a check bit value (e.g. an odd parity bit) assigned to the least significant position and wherein the hexadecimal number of the first PCB in the series is set at the value 04000 excluding the parity bit and utilizes an incremental value of 3 in sequencing from one serial number to the next successive serial number.

Thus, in determining the offset or positioning of the particular PCB serial number in relation to the first serial number within the series, a process is employed which performs the operations of stripping out the first 3 characters (i.e. leaving the hexadecimal value 11403), removing the least significant bit of the result (i.e. leaving the hexadecimal value 8A01), subtracting the starting number value in the series from the result (i.e. leaving the hexadecimal value 4A01), dividing by 3 (i.e. leaving the hexadecimal value 18AB), converting the result into decimal form (i.e. leaving the decimal value 6,315) and adding the value 1 (i.e. providing the result of 6,316).

When the relationship of the particular serial number to the first serial number has been established, as described above, the particular electronic address to be assigned is obtained by determining which address has the same relationship to the first address assigned as the relationship or offset existing between the PCB serial number label and the starting serial number value of the range of serial numbers. This usually can be carried out by performing an add operation, since addresses typically are assigned in blocks having an incrementing value of one. For example, in a 6-digit hexadecimal addressing scheme where the value 23DF00 is the first number of the block of assigned electronic addresses, the sixth electronic address in the block would be the electronic address having the value 23DF05. A more complex series of address values, for example, as where only every third electronic address is to be used, could be readily determined by performing a process similar to the one described above for serial numbers. By performing this process, the result provides the electronic address which is to be written into the PCB. A further parity or other check code may be appended to this result to generate a complete electronic address field within the PCB resident memory element used to store the address.

In the preferred embodiment, the software implemented control mechanism of the present invention is utilized in conjunction with conventional test system equipment for assigning pre-established electronic addresses to PCBs. The control mechanism includes first and second sets of tables for storing entries containing first and last serial number values and first and second electronic address values. The first and last serial number values define a range of valid serial number values for the total number of PCBs of the particular type planned to be manufactured over a given period. The first and last electronic address values define the group of preallocated addresses which were assigned to the manufacturer for use in the printed circuit boards of a particular type.

A group of control routines contained in a control group element operatively couples to test system control software and PCB test software included in the test system. The control group element operatively couples to the sets of tables and to first and second serial number and electronic address subroutine computation element included in the control mechanism. The control group element invokes the appropriate serial number and electronic address selection subroutines following receipt of the PCB label serial number obtained from the test system control software which in the preferred embodiment is optically read from the bar code label affixed to the PCB during the processing of that particular PCB.

After verifying that the serial number is valid through the serial number subroutine computation elements by indirectly examining the entries stored in the first and last serial number tables and determining the offset value to be used based upon the position of that serial number relative to the position of the first serial number value contained in the first table entry, the control element invokes the electronic address subroutine computation elements and utilizes the offset value received from such elements in the selection of a unique electronic address contained within the range of preestablished electronic addresses which is to be written into the memory element of the PCB. By using offset values which define the positional relationships of PCB serial numbers within a range of PCB serial numbers, the control mechanism of the present invention is able to select unique electronic addresses for inclusion in such PCBs without address duplication.

Thus, the control mechanism of the invention ensures that no duplicate addresses will be selected to be assigned to the PCBs over the life cycle and only requires that a manufacturer provide uniquely serial numbered PCBs in conformance with standard manufacturing practices. Further, the control mechanism of the invention needs only the PCB serial number for the selection of a valid unique electronic address within a preestablished range of electronic addresses. This eliminates the need to store or is maintain lists of previously assigned serial numbers or electronic addresses.

Additionally, the control mechanism of the present invention is organized in a modular fashion which allows it to be easily updated or supplemented to accommodate new ranges of serial numbers and new ranges of preallocated electronic addresses for meeting manufacturing production expansion needs.

The above objects and advantages of the present invention will be better understood from the following description when taken in conjunction with the accompanying drawings.

DESCRIPTION OF THE PREFERRED EMBODIMENT

Figure 1:
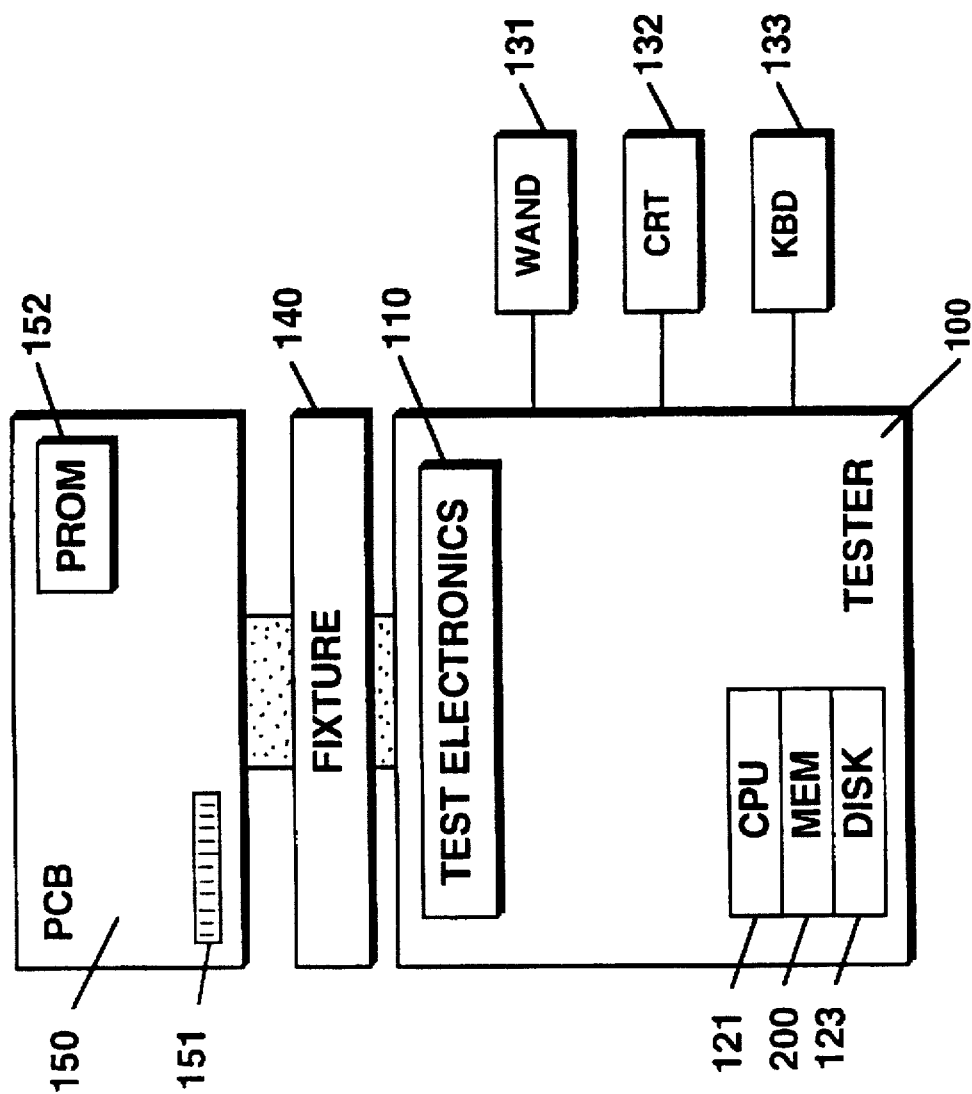
FIG. 1 is a block diagram of testing apparatus/environment which includes the control mechanism and method of the present invention for testing PCBs into which electronic addresses are to be written.

FIG. 1 shows a standard in-circuit test system 100 used to select and write an electronic address into a PROM device 152 of a PCB 150 according to the PCB serial number value encoded in bar code form on a serial number label 151. A fixture 140 is a bed-of-nails interface connecting select networks included in the PCB to driver/sensor test electronics circuits 110 within the test system 100. Power supplies within electronics 110 are used to power the PCB at select times during test operations.

It is common in-circuit test practice to connect one test driver/sensor set to each network included in the PCB, whenever possible. Test drivers are capable of overdriving, that is, to provide more drive to a network than would be provided by the PCB resident driver of the network. The test system 100, therefore, includes circuits to stimulate and measure the various logic devices of a PCB directly, rather than only through PCB input/output connections established by the PCB designer. Thus, test system 100 has the capability to write the contents of PROM devices except when precluded by PCB design particulars such as inadequate bed of nails access provisions or the use of PROM devices requiring higher voltages for writing than would be tolerated by other PCB circuitry. In the preferred embodiment, the PROM 152 is an EEPROM device which operates at standard power and logic levels for all phases of operation (i.e., read and write). Furthermore, the PCB has been designed to allow test access and control.

A keyboard 133 and a cathode ray tube (CRT) display unit 132 serve as the test operator interface. A bar code reader wand 131 is drawn across bar code label 151 by the operator during the test operation. The bar code input is processed by test control software which makes results available to the test program as standard ASCII characters. A central processing unit (CPU) 121, a memory 200 and a disk storage device 123 comprise the computer control section of the test system 100. Typically, these units are part of a standard mini-computer or high performance personal computer. Disk storage device 123 stores all test control software and PCB test software files. Numerous test programs may be stored in the disk device. 123 along with a variety of test related software files. CPU 121 which operatively couples to the test electronics 110 via an interface not shown, controls nearly all- test operations. Memory 200 provides primary storage for the test control software and PCB specific test software required to conduct PCB testing.

Figure 2:
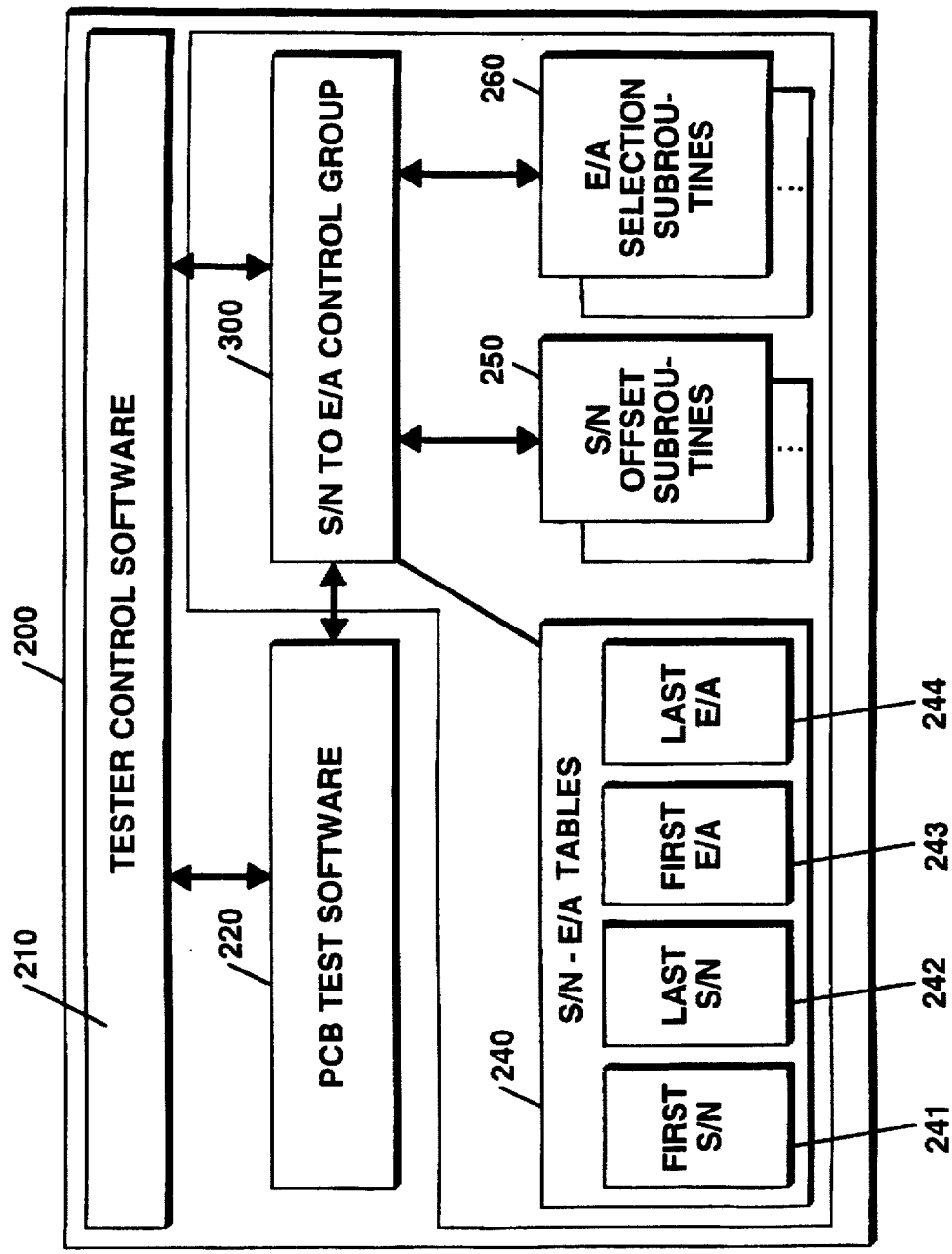
FIG. 2 shows in greater detail, the elements of the control mechanism of the present invention as stored in memory used in conjunction with the other elements of the test system of FIG. 1.

Memory Organization of FIG. 2

FIG. 2 shows the arrangement of elements within memory 200 after the appropriate disk files have been used in loading the test software for the particular PCB type and electronic address selection and write routines under operator control. Test control software 210, provided by the test system manufacturer, contains all of the code necessary to operate the test with the exception of PCB type specific code which is supplied by user programmers. PCB test software 220 provides complete standard incircuit testing for PCB 150. It includes, for example, tests for discrete components such as resistors, which are tested without power applied to PCB 150. It further includes, for example, tests for logic devices on PCB 150, conducted with power applied. Power from test electronics section 110 supplies power and test stimulus and makes test measurements upon PCB 150 as determined by execution of test software 220.

Test control software 210 includes means for reporting test errors to the test operator via CRT 132 or, optionally, via a printer not shown. The software control mechanism which directs electronic address selection is represented in FIG. 2 as block S/N to E/A control group 300. In the preferred embodiment, this control group includes a group of control routines which are added by the user programmer as an appendage to PCB test software 220 which in turn passes program control to control group 300 for the purpose of generating/selecting an electronic address. Control group 300 has an interface to test control software 210 used for transferring information such as for receiving the results previously obtained by performing a bar code read operation on the PCB currently being processed. Once an electronic address has been selected by control group 300, control is returned to test software 220 for writing the electronic address and whatever other data may be necessary (e.g., the serial number) into PROM 152. In the event that control group 300 is unable to select a valid electronic address, an error flag is set in memory and PCB test software 220 will notify the test operator that the PCB must be reworked before its PROM can be loaded.

As indicated in FIG. 2, memory 200 further includes four tables and two sets of subroutines which are accessed by the S/N to E/A control software 300. The four tables are shown as table group 240. Tables 241 and 242 contain, respectively, lists of the beginning and ending serial numbers of a group or range of serial numbers allocated for a lot of PCBs to be manufactured. If the range of serial numbers allocated is sufficient to provide a unique identifier for each PCB of the particular type manufactured during the lifetime of the product, a single valid entry is stored in each of the tables 241 and 242. Entries are made by the user programmer, thereby making the control mechanism a stand alone facility which provides automatic self-tracking. A null value entry is inserted after the last valid entry in each table. Further entries may be added as new groups or ranges of serial numbers are later allocated when manufacturing volumes indicate that the initially allocated range has become inadequate.

A single memory pointer contained in control group 300 is used for accessing entries in both tables 241 and 242. The same pointer is used to select which S/N offset subroutine of the subroutine group 250 will be used in processing the input serial number. That is, each separate subroutine of group 250 is mated to or associated a with particular pair of entries in tables 241 and 242 through the use of a common pointer, even when various subroutines in group 250 are duplicated. This allows the user programmer to concentrate on ensuring that table entries are correct rather than having to be concerned with expending effort in trying to economize on memory space through the re-use of offset subroutines, memory space being of little concern in contrast to electronic address assignment accuracy.

The S/N offset subroutines of group 250 are provided indirect access to the values of table entries and the serial number of the particular PCB through predefined memory fields established within control group 300 rather than having direct access to the tables or test variable fields. This arrangement preserves the modularity of groups 300 and 250. The same arrangement -technique is used to preserve the modularity of electronic address selection group 260 as described herein. The subroutines of group 250 check the validity of the PCB serial number provided by control group 300 and operate to return either an offset value defining the relationship of such PCB serial number to the first serial number value indirectly obtained from table 241 or an offset value computed by a S/N subroutine based on calculating the maximum offset possible given the values of the entries indirectly obtained from tables 241 and 242.

In the latter case, a flag is set in memory and control is returned to control group 300. The set memory flag is used to indicate that the result will be greater than the maximum possible serial number value based on the current pointer setting for tables 241 and 242. This memory flag is reset at the start or entry into each S/N subroutine of group 250. While it is possible to calculate the maximum offset value in advance, in the event that it should be needed, the amount of the time saved in so doing is deemed negligible in contrast to the value in terms of accuracy gained by not maintaining such an independent list of maximum offset values.

It was noted previously that certain elements of the serial number value read from the serial number label may have to be stripped out before the remaining portion may be deemed to represent one value in a group or range of valid serial number values having a uniform increment value. The software element used to perform any such stripping or checking function may be totally contained within the S/N subroutines of group 250. This is not, however, a requirement of the present invention. Any part or all of this operation may have been performed as part of PCB testing by PCB test software 220, if deemed beneficial to program construction. One purpose for structuring control group 300 to operate with more than a single subroutine in group 250 is to allow the use of serial number groups which may contain widely varying formats.

Upon completion of each S/N subroutine of group 250, control group 300 adds the offset value returned by the particular S/N subroutine to a collective, or cumulative offset value stored in memory reflecting values returned by all S/N subroutines of group 250 previously executed during processing of the particular PCB. This collective offset value is set to zero before the execution of the first subroutine of group 250. The S/N offset pointer used by control group 300 is incremented by control group 300 and another S/N subroutine of group 250 is called until either the S/N pointer is found to point to a null value entry in table 241 or an offset value is returned from the last executed S/N subroutine of group 250 without setting the memory flag indicating that an offset value is required which is greater than the maximum possible value returnable by the last S/N subroutine.

It should be emphasized that flow or sequencing of control group 300 is based neither on the history of serial numbers encountered in during the life cycle time of the PCB product nor on electronic addresses previously assigned. For example, it is possible that the first PCB tested in the life cycle time of the product generated an offset higher that any subsequent PCB of that type. The offset value generated depends entirely on the serial number derived from the serial number label.

It is further emphasized that serial number uniformity is restricted only to serial numbers within groups defined by table entry pairs (i.e. each pair of first and last entry values). For example, it is possible that lower offset values are generated by groups of labels with seemingly higher values or with the same values after stripping. Thus, the mechanism of the present invention supports the manufacture of a single PCB design and use of a single PCB test by one manufacturer for a plurality of other manufacturers wherein the principal differences between PCBs of such different manufacturers resides in the series of serial number labels and the series of assigned electronic addresses utilized.

Once the offset value has been determined, control group 300 sets an E/A pointer in memory to one. This pointer is valid for making an entry selection in tables 243 and 244 and a subroutine selection in E/A selection subroutine group 260. These tables and subroutines are set up in a manner similar to tables 241 and 242 and the S/N subroutines of group 250. That is, there is a mating entry in table 244 for each entry in table 243 with the last entry in each table being followed by a null value entry. Also, there is a separate E/A subroutine in group 260 for each valid pair of entries in tables 243 and 244. In a manner similar to subroutines of group 250, those of group 260 have visibility to values of the tables 243 and 244 indirectly through predetermined fields of control group 300.

To begin the electronic address selection process, control group 300 passes control to the E/A selection subroutine selected by the E/A pointer which is initially set to a one value (points to a first E/A subroutine). Each E/A subroutine of group 260 resets a memory flag similar to the memory flag used by S/N subroutines of group 250.

In the case of E/A subroutines, the ultimate return of the memory flag in the set state to control group 300 indicates that the offset value presented to the subroutine was too high in magnitude to be contained within the possible range of values established by the values indirectly obtained from entries of tables 243 and 244, given the incremental value being employed by the particular E/A subroutine. That is, as noted previously, electronic address assignment selection is not limited to use of values having incremental value of one.

It is important to note that the incremental values of one for sequencing from one valid electronic address to another within the various groups or ranges of valid electronic addresses is entirely independent. It is possible, for example, to have the range or group selected by the first pointer position use electronic address values which are in increments of two and have the group or range of electronic addresses selected by the second pointer position use an incremental value (or even decrementing value) of one, all of which have lower values. Furthermore, the operations of calculating and inserting check bits or characters may be performed within the E/A subroutines of group 260 or by the PCB test software 220, as determined to be most beneficial in terms of program structuring.

Each E/A subroutine in group 260 operates to return either a valid electronic address for control group 300 to pass to PCB test software 220 in the case when the E/A memory flag remains reset or to return-the value corresponding to the maximum offset value capable of being represented within the values contained in the entries of tables 243 and 244 designated by the E/A pointer. In the latter case, the E/A memory flag is set to indicate that the resulting electronic address exceeds the range of electronic addresses allowed by the particular table entry values. If the E/A memory flag is set, control group 300 operates to subtract the maximum offset value returned by the last executed E/A subroutine of group 260 from the offset value determined to be required after completing the execution of the last S/N offset subroutine of group 250 reduced by any previous values received by control group 300 from the E/A subroutines of group 260.

Figure 3:
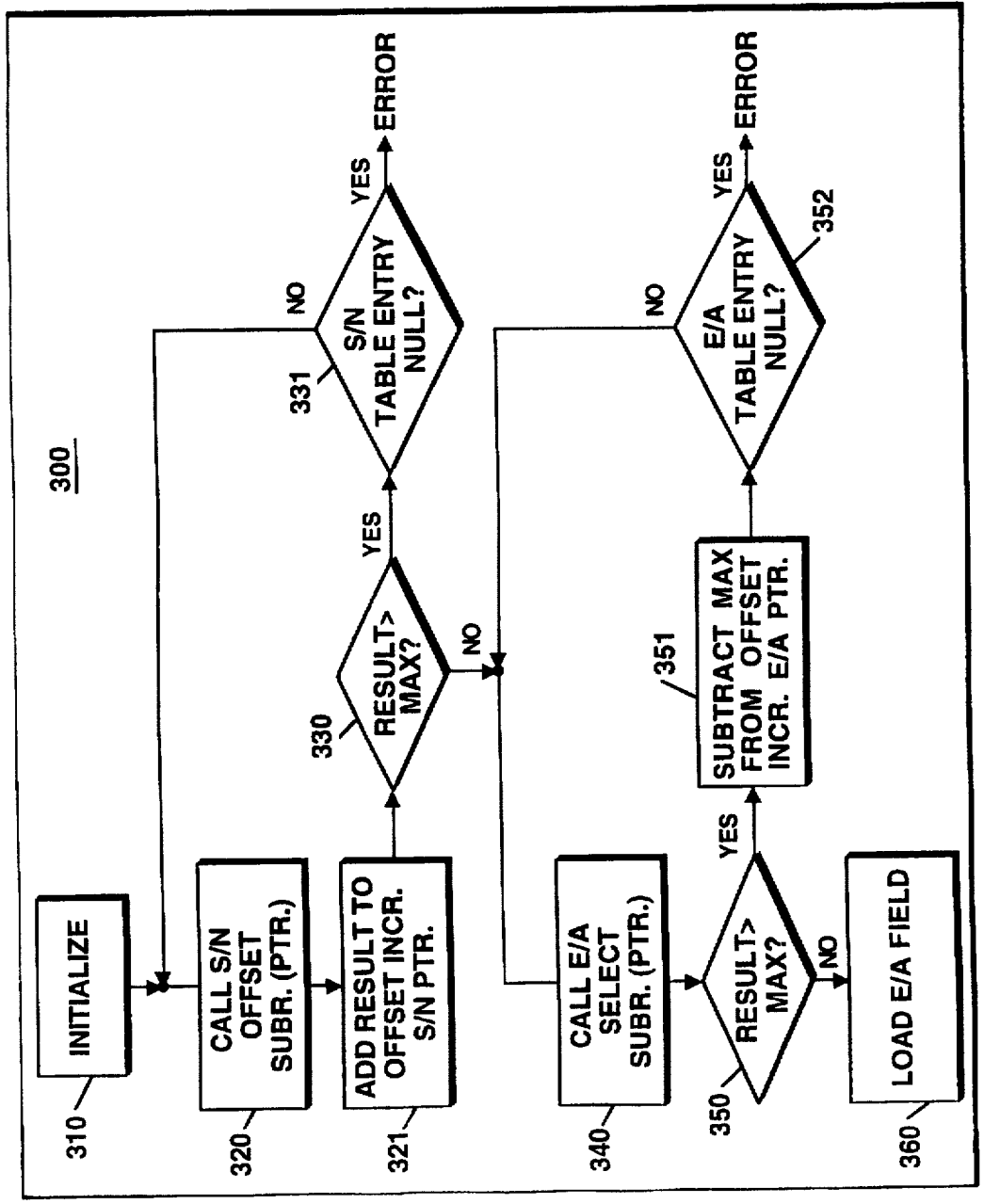
FIG. 3 is an flowchart illustration which depicts the functions performed by the elements of the control mechanism of the present invention in performing electronic address selection according to the teachings of the present invention.

S/N to E/A Control Group 300 of FIG. 3

FIG. 3 illustrates in greater detail, the functional organization and operational flow of S/N to E/A control group 300. The entry point from test software PCB test software 220 is block 310. The S/N and E/A pointers utilized by control group 300 are set to a ONE at this point. A memory flag used by control group 300 to indicate an inability to develop a valid electronic address is initialized to a reset state. The serial number value read from the serial number label affixed to the PCB being processed after undergoing any preprocessing performed by PCB test software 220 is loaded into a predetermined memory location. The offset value is also set to zero and the control group 300 sequences to block 320. In block 320, the control group 300 loads the values obtained from entries of tables 241 and 242 specified by the S/N pointer into predetermined memory locations and the S/N subroutine of group 250 designated by the setting of the S/N pointer setting is invoked/called.

As indicated in block 321, control group 300 adds the offset value returned by the S/N subroutine of group 250 to a cumulative offset value which was originally set to zero during the initialization operation of block 310 and the S/N pointer setting is incremented by one. As indicated in block 330, the state of memory flag returned by the last executed S/N subroutine of the 250 group is checked. If the flag is still in a reset state, this indicates to the control group 300 that the offset value returned by the S/N subroutine was within the range of values specified by the previous pointer setting. In that case, the cumulative offset is treated as a final offset value and the control group 300 sequences to block 340 to begin electronic address selection. If the flag is in a set state, control group 300 treats the offset value returned by the last executed S/N subroutine of group 250 as being the maximum possible value which requires a result greater than the maximum value allowed by the particular range of serial numbers. In this case, control group 300 sequences to block 331 which examines the next pair of entries (per the already incremented pointer setting). If a null value entry is sensed, this indicates that the possibility of finding a serial number corresponding to a valid electronic address has been exhausted and control group 300 returns control back to PCB test software 220 along with a memory error flag being set, as mentioned previously. The offset process continues (i.e. blocks 320 through 331 are repeated) until either a final offset value is determined or a null value table entry is encountered.

As indicated in block 340, control group 300 begins the E/A selection process by first loading the table 243 and 244 entry values designated by the E/A pointer into predetermined memory locations. The E/A pointer was previously initialized to one in block 310. The E/A subroutine of group 260 designated by the pointer setting is then called by control group 300. Upon completion, the E/A subroutine returns its results to two of three memory fields utilized by control group 300. The first memory field is used to store the value of the range of electronic addresses given the current limits defined by the entry values indirectly obtained from tables 243 and 244. The second memory field is used to store an electronic address to be passed to PCB test software 220. Only one of the two memory fields are loaded by the E/A subroutine of group 260 currently being executed. The third memory field is used to store a flag whose state is used for indicating which one of the two other memory fields contains valid data. The flag is reset at the start or upon entry into each E/A subroutine of group 260. When the E/A subroutine determines that the range of electronic addresses defined by the values of entries indirectly obtained from tables 243 and 244 is sufficient to encompass the cumulative offset value obtained from previously executed subroutines of group 250, the flag remains reset and the electronic address computed by the current selected subroutine of group 260 being executed is loaded into the second memory field for control group 300 to pass to test PCB test software 220. In block 350, the state of the memory flag is checked and the control group 300 sequences to block 360 which loads the electronic address into the E/A memory field. Control group 300 then exits passing control back to PCB test software 220 as a result of having achieved success in determining a valid electronic address.

When the memory flag is set, this indicates that a result greater than the maximum possible value within the particular range is required. In that case, the E/A subroutine computes the maximum number of electronic addresses allowed within the range specified by the entry values of tables 243 and 244 designated by the E/A pointer setting. The computed value is loaded into the first memory field by the E/A subroutine. In greater detail in block 350, the control group 300 checks the state of the E/A flag. When the flag is set, control group 300 performs the operations of subtracting this calculated value from the previously stored cumulative offset value and increments the E/A pointer by one as indicated in block 351. Next, control group 300 sequences to block 352. In block 352, control group 300 determines if one of current entries of tables 243 and 244 designated by the current E/A pointer setting has a null value which results in the return of control back to test software 220 along with setting an error flag as indicated. In the absence of a null value being sensed, control group 300 repeats the selection process (i.e. the operations of blocks 340 through 352) until either a valid electronic address is determined or a null entry value is sensed in one of the tables 243 and 244.

DESCRIPTION OF OPERATION

With reference to FIGS. 1 through 3, the operation of the present invention will now be described. Such operation will be described relative to an example of how the control mechanism of the present invention can be used to assign an electronic address to a PCB of a given serial number.

In this example, it is assumed that a manufacturer assigns serial numbers in increments of one using a six digit decimal number preceded by a two character letter code assigned by a higher level of authority. Thus, it is possible to assign up to a million serial numbers before another letter code is required. Serial number assignments are made by attaching a label to each PCB which contains the serial number encoded in bar code format as well as the corresponding printed characters. That is, each PCB has no serial number until a label is attached. The six digit serial numbers are assigned in ranges or groups as the PCB manufacturing process is being planned for producing PCBs of the type which will require electronic address assignment. PCBs without this requirement may be assigned serial numbers in groups or individually in no particular order.

In the present example, it is assumed that a range or group of 1500 contiguous numbers is deemed to be an appropriate allocation for the particular PCB type based on initial production predictions. It is further assumed that the same number of labels was requested from the manufacturing organization responsible for controlling goods distribution and that the organization provided serial number labels that were sequentially numbered CB146000 through CB147499. It is also assumed in this example that a request was made for an allocation of 2048 electronic addresses which resulted in the production organization being notified that it could use six digit hexadecimal electronic addresses having the values E2 C000 through E2 C7FF.

According to the teachings of the present invention, a programmer would incorporate the control software mechanism of the present invention into the PCB software 220 for later loading into the system of FIG. 1. When so loaded, this in turn results in memory 200 being configured as illustrated in FIG. 2. Next, the programmer loads the following table entries into group 240 according to serial number and electronic address assignments. That is, table 241 contains the entry value CB146000 followed by a null entry value; table 242 contains entry value CB147499 followed by a null entry value; table 243 contains the entry value E2C000 followed by a null entry value and table 244 contains entry value E2C7FF followed by null entry value.

Also, in this example, it is assumed that subroutine group 250 contains a single S/N subroutine which examines each serial number it receives as input to determine if it contains an 8-character serial number code beginning with prefix "CB" and ending with a 6-digit decimal number having values between 146000 and 147499. Prior to calling or invoking the S/N subroutine, control group 300 obtained these numbers from the entries contained in tables 241 and 242 and loaded them into a predetermined memory field. That is, as previously discussed, these values are not included as a part of the S/N subroutine code so as to preserve modularity.

If the received PCB serial number is within those bounds, the S/N subroutine performs the operation of subtracting the value 146000 from the decimal portion of the particular serial number, adding one to the result, then loading the hexadecimal equivalent of the result into the memory field set aside for reporting offset values to control group 300. In this example, the "result>max" flag remains in the reset state as described previously. If the received serial number did not meet the described criteria, then the S/N subroutine would use the value 147499 corresponding to the entry indirectly obtained from a location in table 242 designated by the current S/N pointer setting, as a minuend and perform the operations just described, except that it sets the "result>max" flag.

In the present example, it is assumed that subroutine group 260 contains a single E/A subroutine which utilizes values indirectly obtained from the entry values stored in tables 243 and 244 designated by the current setting of the E/A pointer. The E/A subroutine performs the operations of adding the offset value it receives from control group 300 to the value obtained from the table 243 first S/N entry and checking that the result is no greater than the value obtained from the table 244 last entry. If greater, the E/A then sets the "result>max" flag and reports the hexadecimal value of the result obtained from subtracting the value of the table 243 first entry from the table 244 last entry and adding one. In the absence of setting the memory flag, the E/A subroutine performs the operations of adding the offset value to the value of the table 243 first entry, subtracting one from the result and reporting that result (i.e. a valid electronic address) along with the "result>max" flag in a reset state. In the latter two cases, the results are loaded into memory fields previously established for that purpose for subsequent use by control group 300, as previously described.

In the present example, it is assumed that sometime after the system 100 has been in use producing PCBs with electronic address assignments by employing the control mechanism of the present invention, the manufacturer decides to expand production of this particular PCB type. Accordingly, the manufacturer requests another group of 1,000 serial labels which results in the receipt of labels encoded with the range of values CX465400 through CX466399. Also, the manufacturer requests another range or group of 2,048 electronic addresses which results in the allocation of electronic addresses having the values 4FF800 through 4FFFFF.

In the manner described above, the programmer updates/revises the test system software to allow processing of the new labels and new series of electronic addresses. This involves the addition of a single entry to each of the four tables of group 240 located between originally stored first entry value and the null value. The entries inserted in tables 241 through 244 correspond to the values CX465400, CX466399, 4FF800 and 4FFFFF, respectively. Also, the programmer adds a new S/N subroutine to the subroutine group 250. This subroutine is identical to the previous S/N subroutine of the group with the exception that it responds to the prefix character pair "CX" in the same manner as the first S/N subroutine responds to the prefix "CB". The newly added S/N subroutine is installed such that it is invoked by control group 300 when it calls a S/N subroutine from group 250 and the S/N pointer is set to a value of two. In a similar manner, the programmer adds a new E/A subroutine to the subroutine group 260 which is identical to the first E/A subroutine of that group. The second E/A subroutine is installed such that it is called by control-group 300 when the E/A pointer is set to a value of two. As stated previously, the programming economy of only using a single copy of the subroutine, an obvious approach to those skilled in the art, is deemed less important than following a regimen that lessens the possibility of making erroneous address assignments.

The revised system 100 now has the capability of dealing with up to 2,500 serial number labels and of assigning electronic addresses from a reserved group of 4,096 electronic addresses. It is important to note that the programmer is able to update the software without having any knowledge of the quantity or serial numbers of those PCBs previously processed or electronic addresses previously assigned. That is, once the control mechanism of the present invention is in place, there is no need to keep track of this type of data at all for purposes of making electronic address assignments.

Continuing the present example, the processing of a PCB by the control mechanism of the present invention to which the serial label CX465990 has been attached will now be considered in light of the previous explanation. Since the particular PCB being processed is preceded (in terms of serial number labels) by a group of 1,500 "CB" labeled PCBs and 590 "CX" labeled PCBs (i.e., CX465400 –CX465989), it will always be the 2,091 st PCB in the range or series serial numbers regardless of the number of PCBs of the same type which have been previously processed. In the present example, electronic address assignments are made from two groups of 2,048 electronic addresses Hence, according to the teachings of the present invention, the particular PCB being processed is to be assigned the 43rd address of the second group of electronic addresses (i.e., 2,091–2,048=43). The 43rd address of the hexadecimal numbered group of electronic addresses 4FF800 through 4FFFFF is determined by converting 43 decimal to its hexadecimal equivalent "2B", adding the hexadecimal result to the starting electronic address value and subtracting one. This provides a result of 4FF82 A (i.e. 4FF800+2B–1) which is the correct electronic address to be assigned to a PCB having the serial number label CX465990 affixed thereto.

The control mechanism of the present invention operates in the following way to provide an electronic address having the above value. As part of test control software 210 processing, the PCB serial label is read by the operator passing the bar code wand across the serial number label at an appropriate time. In the case of one widely used system, this operation occurs prior to beginning the execution of the PCB test software 220. Other systems may require the operation to be part of PCB test software 220. In either case, the PCB test commands included in PCB test software 220 are then executed to determine if the PCB being processed is free of errors to the extent which may be determined by the test. If errors exist, the PCB may be rejected before any further processing is initiated such as writing into the PROM of the PCB. However, it may be decided to continue in the event of certain select errors.

Where it has been decided to proceed with the PROM loading operation, test software 220 operates to invoke control group 300 after having loaded the results of the serial label read operation into a predetermined memory location for use by control group 300. As indicated in block 310 of FIG. 3, control group 300 carries out a series of operations which place it in an initialized state. This includes resetting the memory error flag which it later uses to signal test software 220 if it is unable to determine a valid electronic address assignment for the particular PCB being processed, setting to zero the memory field reserved for storing a cumulative offset value, placing the serial label results received from software 220 in a predetermined memory location for use by the S/N subroutines of group 250 and setting the S/N and E/A pointers to a first setting of one. Also, the control group 300 loads the values found in table entries of tables 241 and 242, designated by the S/N pointer, into memory fields reserved for access by subroutines of the S/N offset group 250.

As indicated in block 320, the control group 300 next invokes the subroutine of group 250 designated by the setting of S/N pointer. As described previously, the S/N offset subroutine installed by the first programmer which is invoked by the first setting of the S/N pointer determines that the particular serial number is outside the range of serial numbers that the subroutine is able to-process based on the absence of a "CB" prefix code in the first two serial number character positions. Thus, the S/N subroutine responds by loading the offset memory field with the hexadecimal equivalent of the difference in value between the indirectly obtained entries stored in tables 241 and 242 plus 1. In this example, the decimal difference is 1,499 and the hexadecimal equivalent is 5DB. This results in the generation of an offset value of 5DC. The S/N offset routine also sets the "result>max" flag before returning control back to control group 300.

As indicated in block 321 of FIG. 3, control group 300 performs the operations of adding the offset value received from the S/N subroutine to the cumulative offset memory field previously initialized to zero, yielding a value of 5DC and then incrementing the S/N pointer to the second position. Next, as indicated in block 330, control group 300 examines the state of the "result>max" flag. Found to be set, the control group 300 checks tables 241 and 242 for the presence of a null value in either entry whose location is designated by the current pointer position setting. Since the second entry of neither table 241 nor 242 contains null value (i.e. the values stored are CX465400 and CX466399, respectively), control group 300 copies those entries into the predetermined memory field and invokes the second subroutine of group 250.

Upon finding that the particular serial number of the PCB being processed has a "CX" prefix and a decimal suffix which it is able to process, the second S/N subroutine performs the operations of subtracting the value 465,400 from the decimal portion of the particular serial number (i.e. 465,990) and returning to load the hexadecimal equivalent plus one into the offset memory field. In this example, the loaded value is 24F (i.e. 465,990–465,400=590 decimal= 24E hexadecimal+1=24F ). The "result>max" flag remains reset by the second S/N subroutine. As indicated in block 321 of FIG. 3, control group 300 adds the received offset value to the cumulative offset memory field which yields a result of 82B (i.e. 5DC+24F). As indicated in block 330, control group 300 upon finding the memory S/N flag reset sequences to execute the operations/code of block 340.

As indicated in block 340, control group 300 copies the values of tables 243 and 244 designated by the current E/A pointer setting into the memory fields provided for examination by E/A selection subroutine group 260 and invokes the first subroutine as specified by the pointer setting. The invoked E/A subroutine determines if the cumulative offset value exceeds the range established by the two values indirectly obtained from tables 243 and 244. Accordingly, the E/A subroutine loads the computed value defining the range of addresses represented by those entries into the memory field reserved for that purpose for examination by control group 300. In this example, the entries are E2C000 and E2C7FF which represent a range of 800 hexadecimal electronic addresses. The E/A subroutine sets the "result>max" flag before returning control back to control group 300.

As indicated in block 350, control group 300 finds that the memory flag has been set. As indicated in block 351, control group 300 next performs the operation of subtracting the returned result from the cumulative offset value of 82B previously determined which provides a new cumulative offset value of 2B (i.e. 82B–800=2B) and increments the E/A pointer setting. Upon completing block 352 and finding that the new entry values of tables 243 and 244 do not contain a null value, control group 300 copies those values into the predetermined memory fields and invokes the second E/A subroutine of group 260. The values presented to the second E/A subroutine are an offset of value of 2B, a first electronic address of 4FF800 and the value 4FFFFF. Finding the offset value to be within the range of values presented, the E/A subroutine performs the operations of adding the offset value to the first electronic address value (E/A), subtracting 1 and loading the result into the E/A memory field provided for that purpose for use by software control group 300. The result value in this example is 4FF800+2B–1=4FF82A. Since the "result>max" flag will be reset, software control group 300 copies the result into the memory field provided for use by PCB test software 220 before returning control back to that software.

From the above example, it is seen how the control mechanism of the present invention can be updated to provide a greater number of electronic addresses to accommodate production expansion.

It will be appreciated that many changes may be made to the software implemented mechanism of the preferred embodiment. For example, the mechanism of the present invention may be utilized in conjunction with a variety of different types of board test equipment and associated test software element. Also, the labeling and introduction of board serial numbers may be accomplished using different techniques including manual entry. Furthermore, the selection and writing of electronic addresses may be accomplished independent of manufacturing test operations using the teachings of the present invention.

It will be appreciated by those skilled in the art that a particular range may be divided into a number of independent series of smaller ranges with some additional complexity. While the preferred embodiment was described in terms of examples which utilized simple relationships for each of the ranges of PCB serial numbers labels and assignable electronic addresses, this should not be construed as a limitation of the present invention. For example, the relationships or processes utilized in determining successive serial number values and in selecting preassigned electronic addresses can involve the execution of both simple operations (similar or different) as well as combinations of operations. Other variations will readily occur to those skilled in the art.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method of allocating electronic addresses to printed circuit boards (PCBs) of a particular type during an operation in which the PCBs are installed in and tested by PCB test software installed in the memory of a test system, each PCB including a memory element into which an electronic address can be written when installed in the system, the method comprising the steps of:

(a) reading a serial number value associated with each PCB installed in the system, the serial number value having a predetermined relationship to serial number values within a range of serial numbers associated with PCBs of that type;

(b) determining an offset value of the particular PCB serial number derived from step (a), in relation to a first number within a range of valid serial numbers defined by entries contained in a first set of tables stored in the memory by utilizing a first number of subroutines stored in the memory; and (c) selecting an electronic address utilizing a second number of subroutines stored in the memory using the offset value obtained in step (b) from a range of valid preallocated electronic addresses defined by entries contained in a second set of tables stored in the memory.

2. The method of claim 1 wherein step (a) includes reading the serial number value encoded on each PCB.

3. The method of claim 2 wherein the serial number value is encoded on a label affixed to each PCB.

4. The method of claim 1 wherein the first number of subroutines includes a number of offset subroutines and step (b) includes the steps of:

(1) invoking as many of the offset subroutines as are required for generating an offset value to be added to a cumulative offset value stored in the memory which identifies the relative position; and, (2) each offset subroutine setting a memory flag in the memory indicating when the serial number being processed by the offset subroutine being executed was found to be outside the range of serial number entries associated with the offset subroutine being executed.

5. The method of claim 1 wherein the serial numbers within the range have a predefined relationship to each other which is either simple or complex.

6. The method of claim 5 wherein the predefined relationship is one wherein successive serial numbers within the range of serial number values can be derived directly from the serial number encoded on the PCB by performing a number of predetermined operations on the serial number using entry values obtained from the first set of tables.

7. The method of claim 6 wherein the predefined number of operations can be either a single operation or a combination of operations.

8. The method of claim 1 wherein the electronic addresses are hexadecimal values.

9. The method of claim 1 wherein the second number of subroutines include a number of electronic address assignment subroutines and step (c) includes the step of:

invoking as many of the number of electronic address assignment subroutines as are required for selecting a valid electronic address from one of a number of ranges of valid electronic addresses defined by entries in the second set of tables associated with the electronic address assignment subroutine being executed using the offset value generated in step (b).

10. An electronic address generation facility for use in a test system for providing unique preestablished addresses which are to be written into the memory elements of printed circuit boards during the manufacture thereof, each PCB being previously encoded with a scannable board serial number label, the test system including a processing unit and a memory coupled to the processing unit containing test software for directing the testing of PCBs when installed therein, the electronic address generation facility being installable in the memory of the test system and comprising:

(a) a first set of tables containing first and last serial number entries defining one of number of ranges of board serial numbers which are to be assigned to all of the PCBs of a particular type manufactured over a life cycle time period;

(b) a second set of tables containing first and last electronic address entries defining one of a number of preestablished electronic addresses which can be utilized by a manufacturer of all of the PCBs of the particular type;

(c) a subroutine selection and control element operatively coupled to the test software and to the first and second sets of tables;

(d) a number of offset subroutine computation elements operatively coupled to the control element, each offset subroutine computation element for deriving offset values for a predetermined one of the ranges of serial numbers; and (e) a number of electronic address subroutine computation elements operatively coupled to the control element, each electronic address subroutine computation element for generating unique electronic address values in one of the ranges of preestablished electronic addresses defined by the first and last electronic address entries contained in the second set of tables, the control element in response to a first signal from the test software indicating near completion of having tested the PCB installed in the test system, requesting the test software to read the scannable board serial number of the PCB, the control element upon receiving a representation of the board serial number invoking in succession each of the number of offset subroutine computation elements until a second signal is received specifying the validity of the board serial number and a value indicating the sequence position of the board serial number within the range and in response to the signal from one of the offset computation element indicating that the board serial number is valid the control element invoking one of the electronic address subroutine computation elements as a function of the value of the board serial number for generating a unique electronic address within the range of electronic addresses defined by the second set of tables from the sequence position value for writing into the memory element of the PCB having been tested by the test software.

* * * * *